(12) United States Patent
Chen et al.

(10) Patent No.: US 10,788,392 B2
(45) Date of Patent: Sep. 29, 2020

(54) CONDUIT LEAKAGE DETECTION SYSTEM AND METHOD

(71) Applicant: WISTRON NEWEB CORPORATION, Hsinchu (TW)

(72) Inventors: Horen Chen, Hsinchu (TW); Ya-Ping Wei, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 309 days.

(21) Appl. No.: 15/978,492

(22) Filed: May 14, 2018

(65) Prior Publication Data

US 2019/0107460 A1 Apr. 11, 2019

Related U.S. Application Data

(60) Provisional application No. 62/568,794, filed on Oct. 6, 2017.

(51) Int. Cl.
*G01M 3/40* (2006.01)
(52) U.S. Cl.
CPC ..................... *G01M 3/40* (2013.01)
(58) Field of Classification Search
CPC ... G01M 3/40; H04L 41/0609; H04L 41/0618
See application file for complete search history.

(56) References Cited

U.S. PATENT DOCUMENTS

| | | | | |
|---|---|---|---|---|
| 6,833,859 B1* | 12/2004 | Schneider | .......... | G01R 29/0814 348/192 |
| 9,179,337 B2* | 11/2015 | Zinevich | ............. | H04L 43/0823 |
| 2017/0023434 A1* | 1/2017 | Jerez | ....................... | E03B 7/003 |

* cited by examiner

*Primary Examiner* — Bryan Bui
(74) *Attorney, Agent, or Firm* — Li & Cai Intellectual Property (USA) Office (57) ABSTRACT

Conduit leakage detection system and method are provided. The system includes a first detection unit, a processor, and a memory. The first detection unit includes a first transceiver and a second transceiver communicates with the first transceiver to detect a conduit. The first transceiver sends a first probe signal toward a first direction, and the second transceiver is configured to receive the first probe signal. The memory stores a first preset channel state information (CSI), and the first preset CSI including a first CSI and a first normal CSI. The processor obtains a first current CSI from the first probe signal by performing a time-reversal process, and compares the first current CSI to the first preset CSI. When the first CSI is matched to the first current CSI, a first conduit leakage event associated with the conduit is determined to be occurred.

20 Claims, 8 Drawing Sheets

CONDUIT LEAKAGE DETECTION SYSTEM AND METHOD

BACKGROUND OF THE INVENTION

1. Field of the Invention

The present disclosure relates to a conduit leakage detection system and method, and in particular, to a conduit detection system and method that detect leakages associated with the conduit by obtaining channel state information (CSI) from the time-reversal process.

2. Description of Related Art

Current methods for the identification and location of leakage are associated with very high costs, not least for underground pipelines. Leakage from underwater pipelines is also difficult to detect. One method of identifying leakage from underwater sewer lines is the so-called 'seagull method'. If the population of circulating seagulls increases sharply close to a sewer line, leakage can be suspected. Other methods may be to seal the upstream end of the pipeline to see if any water emerges from the downstream end, pressure measurements, and emptying followed by visual inspection. However, it is difficult to detect minor leakages if there are pressure sensors only at the pump station and not in the piping network.

Furthermore, the existing methods for detecting leakages in the conduits are limited. The leakage tests for conduits are performed only when leakage events occur, and the conduits may be passively repaired only after positions of the leakages are found. The thermal imaging or pressure gauges are known to those skilled in the arts for being used to detect leakages in pipes to determine where the conduit is damaged. However, the existing leakage detection for ultra-long conduits may be laborious and time-consumed.

SUMMARY OF THE INVENTION

According to an embodiment of the present disclosure, there is provided a conduit leakage detection system including a first detection unit, a processor, and a memory. The first detection unit includes a first transceiver; and a second transceiver, the second transceiver communicates with the first transceiver to detect a conduit. The first transceiver is configured to send a first probe signal toward a first direction and is disposed at a first side of the conduit, and the second transceiver is configured to receive the first probe signal. The memory is connected to the processor and is configured to store a first preset channel state information (CSI), and the first preset CSI includes a first CSI and a first normal CSI. The processor is configured to obtain a first current CSI from the first probe signal by performing a time-reversal process, and to compare the first current CSI to the first preset CSI. When the first CSI is matched to the first current CSI, a first conduit leakage event associated with the conduit is determined to be occurred.

According to another embodiment of the present disclosure, there is provided a conduit leakage detection method including: providing a first detection unit, and the first detection unit includes a first transceiver disposed at a first side of the conduit and a second transceiver; communicating the first transceiver with the second transceiver to detect a conduit; configuring the first transceiver to send a first probe signal toward a first direction; configuring the second transceiver to receive the first probe signal; configuring a memory connected to a processor to store a first preset channel state information (CSI), and the first preset CSI including a first CSI and a first normal CSI; configuring the processor to obtain a first current CSI from the first probe signal by performing a time-reversal process, and to compare the first current CSI to the first preset CSI. When the first CSI is matched to the first current CSI, a first conduit leakage event associated with the conduit is determined to be occurred.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as modes of use, further objectives and advantages thereof, will best be understood with reference to the following detailed description of exemplary embodiments of the present disclosure when read in conjunction with the accompanying drawings, wherein:

DETAILED DESCRIPTION OF THE PREFERRED EMBODIMENTS

Figure 1A:
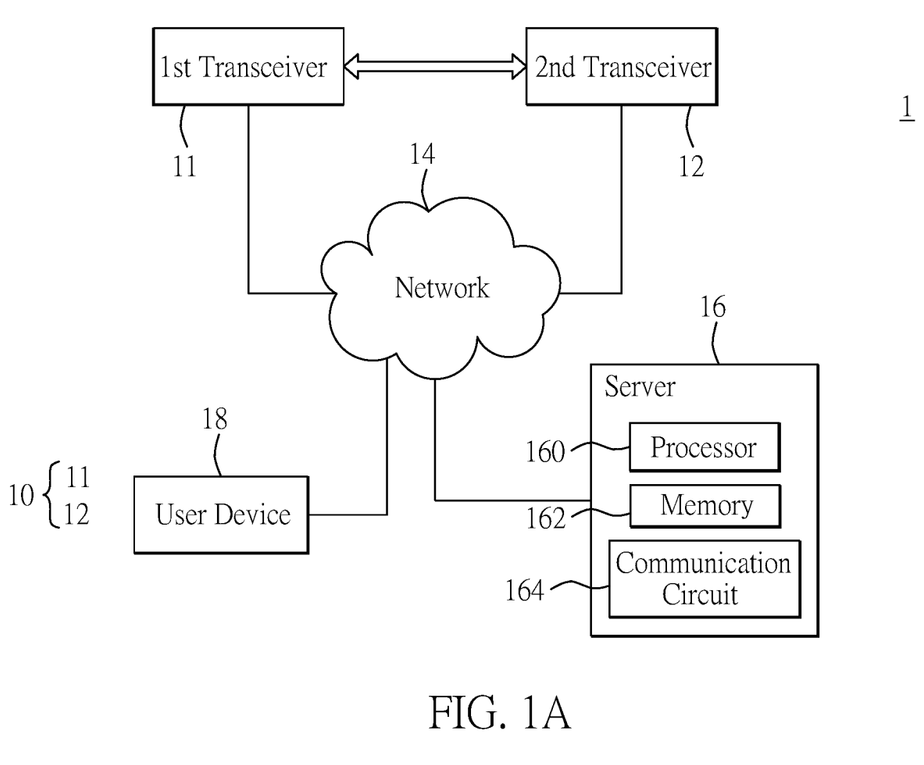
FIG. 1A shows a diagram of a conduit detection system is depicted in accordance with an exemplary embodiment.
Figure 1B:
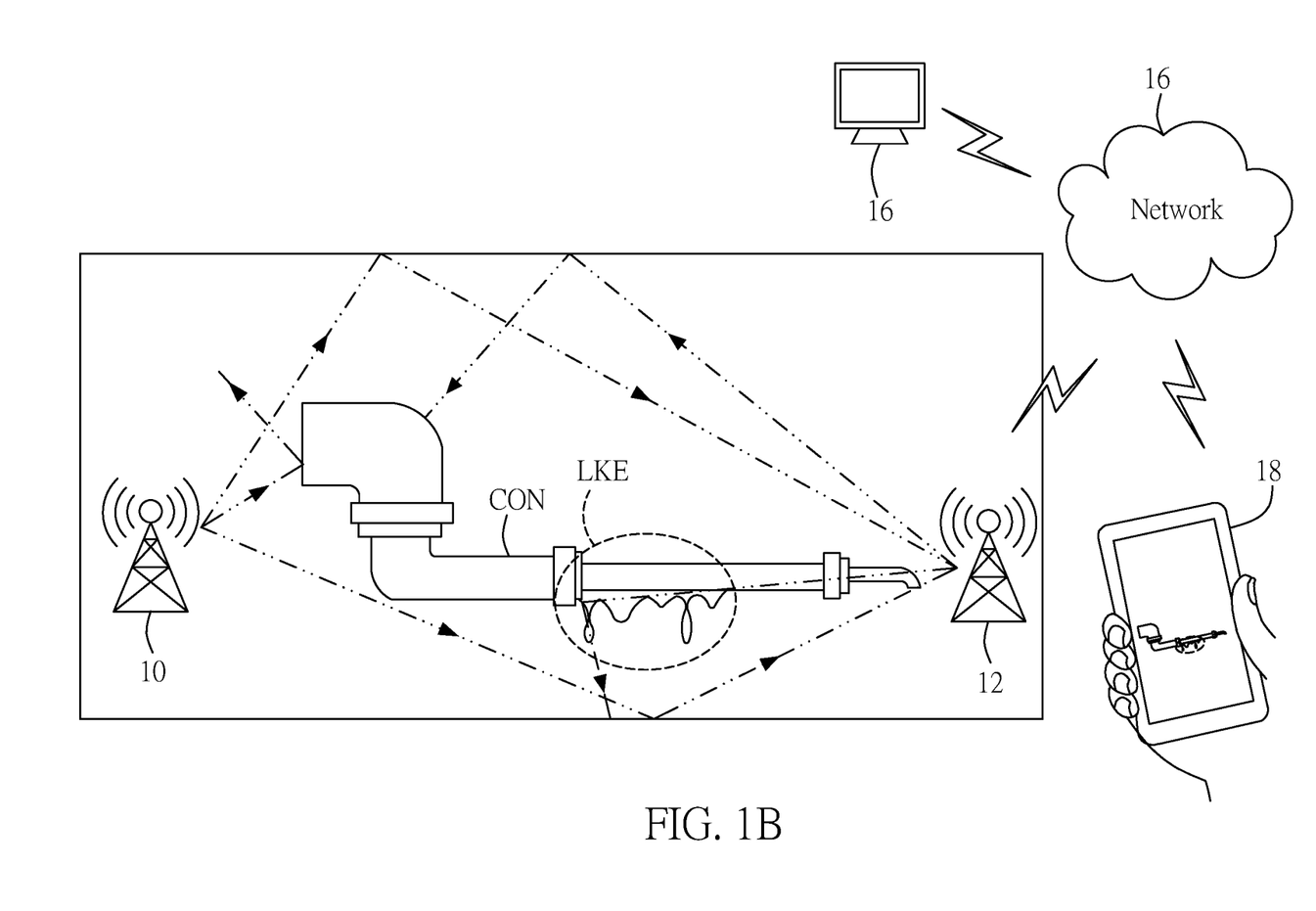
FIG. 1B shows a schemetical diagram of the conduit detection system in accordance with an exemplary embodiment.

Referring more particularly to the drawings, embodiments of the disclosure may be described in the context of the conduit detection system as shown in FIGS. 1A and 1B.

As shown in FIGS. 1A and 1B, a diagram of a conduit detection system and a schemetical diagram of the conduit detection system are depicted in accordance with an exemplary embodiment of the present disclosure. The conduit detection system 1 may be implemented in any type of computing device. In this embodiment, the conduit detection system 1 may include a first detection unit 10, a server 16 and a user device 18. The first detection unit 11 includes a first transceiver 11 and a second transceiver 12 for analyzing time reversal responses to detect leakage associated with the conduit. The second transceiver 12 may be configured to be as the same as the first transceiver 10.

In this embodiment, the first transceiver 11 may includes a smart antenna, sends a wireless signal that propagates through a wireless channel and arrives at the second transceiver 12 as a multipath wireless signal. The smart antenna may be implemented in this embodiment and the smart antenna has antenna array supporting directional or omnidirectional radiation patterns. Furthermore, the first transceiver 11 may also include radio frequency (RF) circuit(s), intermediate frequency (IF) circuit(s) and baseband circuit (s).

The antenna controlling circuit may be included in the first transceiver 11 to be configured to control the antenna of the transceiving circuit of the first transceiver 11 to transmit/receive signals in different frequency bands, in different directions, and/or in different polarizations, in the same or similar frequency bands, in the same or similar directions, and/or in the same or similar polarizations.

In some embodiments, the antenna controlling circuit may adjust carrier frequency, direction and/or polarization of signal transmissions and signal receptions. Specifically, the frequency range of the first probe signal may between 30 GHz and 300 GHz. The antenna controlling circuit can be configured to adjust the first transceiver 11 to be comply with the IEEE 802.11 standard. The IEEE 802.11 standard can include at least one of IEEE 802.11a, IEEE 802.11b, IEEE 802.11g, IEEE 802.11n, IEEE 802.11ac, or IEEE 802.11ad standards. Preferably, the antenna controlling circuit can be configured to adjust the first transceiver 11 to be comply with 802.11ad (60 GHz Wi-Fi). Compared with 802.11n 2.4 GHz, 802.11ad has a wider channel width up to 2 GHz, which is 100 times that of 802.11n. Basically, the wider frequency band width may increase the precision of detection by obtaining more CSI, and would assist the determination of existence of the conduit leakage. Moreover, in 802.11ad standard, the multi-antenna antenna array may be utilized for concentrating more energy while scanning in multiple directions.

In more detail, the corresponding wavelength of the 30 GHz 300 GHz signal is from about 1 cm to about 1 mm in the electromagnetic spectrum. Since the corresponding wavelength is relatively short to be easily reflected, the resolution may be improved, and the detail structure of the target may be clearly observed and the indoor multipath effect may be obvious. Furthermore, the high frequency leads to excellent linearity of the transmission. When the radio waves penetrate the obstacle, the reflection phenomenon would cause the signal having strong differences.

Furthermore, the reflection phenomenon between two different mediums may be influenced by the difference between the frequencies and the difference between the characteristics of the medium. For signals with high-frequency, various materials are not easily penetrated and are prone to refract. Therefore, the conduit leakage events are more easily detected by adjusting the first transceiver 11 and the second transceiver 12 to be comply with the 802.11ad standard.

The first transceiver 11 may further include a communication circuit, which is provided for communications with other data processing systems or devices through the network 14, such as the server 16. In these examples, the communications circuit may be a backhaul communication circuit that supports Wide Area Network (WAN), which can transmit signal via 2G, 3G, LTE, 5G and etc. The communications circuit may provide communications through the use of either or both physical and wireless communications links.

The server 16 may be inherently provided with a processor 160, a memory 162, and a communication circuit 164. The processor 160 serves to execute instructions for software or firmware that may be loaded into the memory 162. The processor 160 may be a set of one or more processors or may be a multi-processor core, depending on the particular implementation.

The memory 162, in these examples, may be a random access memory. The memory 162 may take various forms depending on the particular implementation.

Furthermore, the processor 160 may be provided for controlling the first transceiver 11 and the second transceiver 12 through the communication circuit 164. Specifically, the processor 160 may be configured to perform the detection algorithm stored in the memory 162 for detecting leakages associated with the conduit. It should be noted that the processor 160 and the memory 162 may be disposed in the transceiver 11 or the transceiver 12.

The user device 18 may provide wireless communication capabilities to the network 16. The user device 18 may be configured to receive alarms associated with conduit leakages when the conduit leakage events are detected to be occurred.

In the architecture as shown in FIG. 1B, the conduit detection system utilizes scattered waves caused by sending the probe signal through the region to be detected in the conduit CON. That is, the system obtains the channel state information (CSI) after the probe signal is processed by the time-reversal (TR) process to determine whether a leakage event LKE occurs and to estimate the approximate a position where the leakage event occurred. CSI is information that can represent the channel properties of a communication link to thereby estimate the channel. More specifically, CSI describes how a signal propagates from the transmitter(s) to the receiver(s) and reveals the combined effect of, for instance, scattering, fading, and power decay with distance.

In detail, TR process including a channel probing phase and a TR transmission phase, during the channel probing phase, the transceiver A sends a probe signal, such as an impulse, to the transceiver B, which produces an estimated CSI for the multipath channel between the transceivers A and B. Then, the corresponding characteristic parameters of CSI is obtained by time-reversing and conjugating the estimated CSI. During the TR transmission phase, the transceiver B transmits back the time-reversed and conjugated CSI and generates a spatial-temporal resonance at the transceiver A by fully collecting and concentrating the energy of the multipath channel. Alternatively, transceiver B may store the time-reversed and conjugated CSI without transmitting the time-reversed and conjugated CSI. The TR spatial-temporal resonance can be viewed as the resonance of EM field in response to the environment, also known as the TR focusing effect.

When the propagation structure changes, the received multipath profile varies correspondingly. As a consequence, the spatial-temporal resonance at the receiver side changes and can be used to track the leakages in the conduit.

The presented characteristics of conduit leakage including surface aging, cracking, severity of cracking, partial surface damage, notch, peelings or surrounding damages at the conduit, and surface permittivity, electromagnetic wave velocity, etc., are different from those of normal conduits.

Since the probe signals will be reflected from the ground, water, or the presented characteristics of conduit leakages, it will cause multipath propagation. The signal received by the second transceiver 12 does not come from a single path, but is a collection of multiple reflections of multipaths. The TR Wireless technology used in the present application utilizes the characteristics of the multi-path reflections, which are commonly considered as interference sources, to obtain different signals due to different reflections and signal attenuations of the medium, water quantity, or surface condition. The CSI is obtained from the received signals propagated through multiple paths by performing time-reversal process. The obtained unique CSI characteristics are served as a basis for distinguishing between a leakage event and a normal event.

Therefore, TR Wireless technology may be utilized to collect multi-path reflections from the conduit and surrounding conditions related to the conduit with or without leakages, and the CSI can be respectively calculated and compared with each other for detecting the leakage associated with the conduit.

Figure 1C:
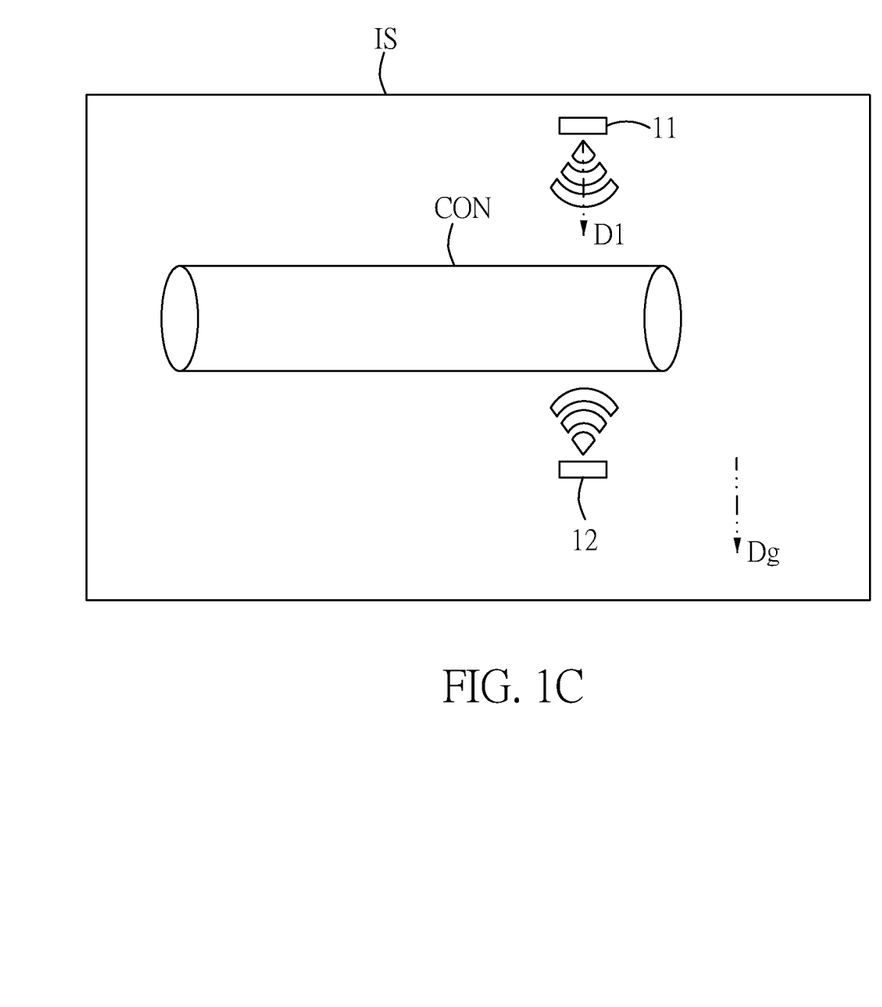
FIG. 1C shows an arrangement of the first and second transceivers according to an embodiment of the conduit detection system of the present disclosure.

Reference is now further made to FIG. 1C, FIG. 1C shows an arrangement of the first and second transceivers according to an embodiment of the conduit detection system of the present disclosure.

Based on the above architecture, the second transceiver 12 communicates with the first transceiver 11 to detect a conduit CON, the first transceiver 11 including a directional antenna may be disposed at a first side of the conduit CON, and is configured to send a first probe signal by configuring the directional antenna toward a first direction D1, and the second transceiver 12 may be disposed at a second side of the conduit CON, and may be configured to receive the first probe signal. In one embodiment, the first transceiver 11 and the second transceiver 12 may be disposed along a gravity direction Dg, and the first direction D1 is along the gravity direction. In another embodiment, the places of the first transceiver 11 and the second transceiver 12 may be exchanged. Preferably, the disposition of the first transceiver 11 and the second transceiver 12 is shown in FIG. 1C because the second transceiver 12 which receives the probe signal is close to the abnormal area, i.e., leakage area. Please note that the second transceiver 12 which is close to the abnormal area can obtain more abnormal information.

The first transceiver 11 and the second transceiver 12 may be controlled by the server 16 through the network 14. The memory 162 connected to the processor 160 is configured to store a first preset channel state information (CSI), and the first preset CSI including a first CSI and a first normal CSI. Specifically, the first CSI and the first normal CSI are respectively obtained by performing a time-reversal operation on the first probe signal in response to a first conduit leakage event and a normal event occurred in the indoor space IS. The normal event may be defined as that there's not any leakage event occurred in the indoor space IS, and the first conduit leakage event may be defined as that the conduit CON is leaking.

In the embodiment, the processor 160 is further configured to obtain a first current CSI from the first probe signal by performing a time-reversal (TR) process, and to compare the first current CSI to the first preset CSI. When the first CSI is matched to the first current CSI, a first conduit leakage event associated with the conduit CON is determined to be occurred.

In more detail, the conduit detection system 1 of the present embodiment exploits the intrinsic property of TR technique that the spatial-temporal resonance fuses and compresses the information of the multipath propagation environment. To implement the indoor events detection based on the TR spatial-temporal resonances, the detection operation consists of two phases: the offline training and the online testing.

During the offline training phase, a database is built where the multipath profiles of any targets are collected and stored as the TR signatures.

Suppose there are n Event $S_i$, the n Event $S_i$ represent a variety of indoor events defined by the user. The corresponding training CSI samples are estimated and form a matrix $H_i$, which is defined as following equation (1):

$$H_i=[h_{i,t0},h_{i,t1},\ldots,h_{i,tN-1}] \quad (1)$$

Where N is the size of CSI samples for a training event. $h_{i,tj}$ represents the estimated CSI vector of event $S_i$ at time tj and $H_i$ is named as the CSI matrix for event $S_i$. The corresponding TR signature matrix $G_i$ can be obtained by time-reversing the conjugated version of $H_i$ as following equation (2):

$$G_i=[g_{i,t0},g_{i,t1},\ldots,g_{i,tN-1}] \quad (2)$$

where the TR signature $g_{i,tj|k|}=h^*_{i,tj|L-k|}$ is the time-reversed and conjugated version of $h_{i,tj}$. Then the training database G is the collection of $G_i$'s. The training database G is then stored in the memory 106.

After constructing the training database G, the conduit detection system 1 is ready for real-time indoor event detection. In this regards, the conduit leakage event is detected through matching its multipath profiles to TR signatures in the training database G. By leveraging the TR technique, the dimensions of the CSI may be able to be naturally compressed through mapping them into the strength of the spatial-temporal resonances. The strength of the spatial-temporal resonance (TRRS) $TR(h_1, h_2)$ between two CSI samples $h_1$ and $h_2$ is defined as following equation (3):

$$\mathcal{TR}(h_1, h_2) = \left( \frac{\max_i |(h_1 * g_2)[i]|}{\sqrt{\sum_{l=0}^{L-1} |h_1[l]|^2} \sqrt{\sum_{l=0}^{L-1} |h_2[l]|^2}} \right)^2 \quad (3)$$

where "*" denotes the convolution and $g_2$ is the TR signature of $h_2$ as, $g_2|k|=h_{2*}|L-k|$, $k=0, 1, \ldots, L-1$.

During the online monitoring phase, the processor 160 keeps matching the current estimated CSI to the TR signature in G to find the one that yields the strongest TR spatial-temporal resonance, computed by the testing CSI matrix H and the signature matrix $G_i$ for each trained events $S_i$.

The similarity between CSI samples are quantified by the value of TRRS. When comparing the estimated CSI with the TR signature in the database, only when CSI samples are from the identical event there will be a strong spatial-temporal resonance.

Similarly, to implement the conduit leakage events detection in the indoor space IS based on the TR spatial-temporal resonances, the detection operation consists of the offline training phase and the online testing phase.

During the offline training phase, two events are provided for establishing the preset CSI, which includes a first CSI and a first normal CSI. The first normal CSI corresponds to one event that the conduit CON is normally used, such as the fluid is normal moved through the conduit, and the first CSI corresponds to another event that the conduit CON is leaking. Specifically, the first CSI and the first normal CSI are respectively obtained by performing a time-reversal operation on the first probe signal in response to a first conduit leakage event and a normal event occurred in the indoor space IS.

Therefore, when the conduit CON is normally used, the first transceiver 11 is configured to send a probe signal, the second transceiver 12 is configured to receive the probe signal, and the processor 160 is configured to obtain the first normal CSI from the probe signal by performing the TR process.

On the other hand, when the conduit CON is leaking, the first transceiver 11 is configured to send the probe signal, the second transceiver 12 is configured to receive the probe signal, and the processor 160 is configured to obtain the first CSI from the probe signal by performing the TR process, that is, the preset CSI is a reverse sequence of a CSI of the probe signal. The obtained first CSI and normal CSI are further stored in the memory 162.

Figure 2:
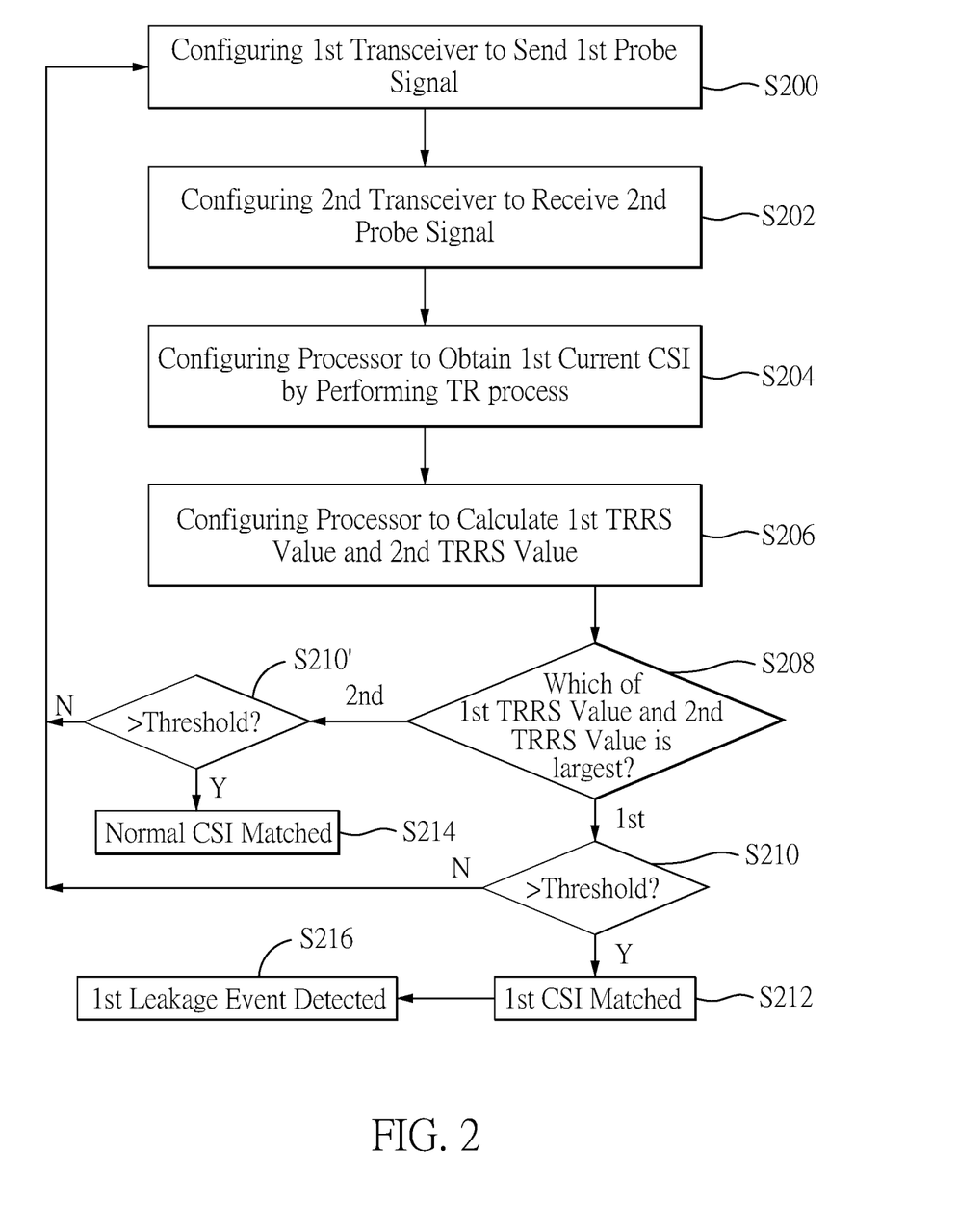
FIG. 2 shows a flow chart for detecting the leakage associated with the conduit according to an embodiment of the present disclosure.

Reference is now made to FIG. 2, which shows a flow chart for detecting the leakage associated with the conduit according to an embodiment of the present disclosure. During the online monitoring phase, that is, step S200, configuring the first transceiver 11 to send a first probe signal.

Step S202, configuring the second transceiver 12 to receive the first probe signal.

Step S204, configuring the processor 160 to obtain a first current CSI from the first probe signal by performing the TR process.

Step S206, configuring the processor 160 to calculate a first time-reversal resonating strength (TRRS) value between the first current CSI and the first CSI, and a second TRRS value between the first current CSI and the first normal CSI.

After the first TRRS value and the second TRRS value are obtained, proceed to step S208, configuring the processor 160 to determine which of the first TRRS value and the second TRRS value is largest, and proceed to step S 210, to determine whether the first TRRS value and the second TRRS value larger than a threshold.

In this case, if the first TRRS value is larger than the second TRRS value and a threshold, proceed to step S212, the first CSI is determined to be matched to the first current CSI. If the second TRRS value is larger than the first TRRS value and the threshold, proceed to step S214, the first normal CSI is determined to be matched to the first current CSI.

If the first TRRS value and the second TRRS value are smaller than the threshold, return to step S200 to re-send the probe signal from the first transceiver 11.

Furthermore, when the first CSI is matched to the current CSI, the method proceeds to step S216, the first conduit leakage event is determined to be detected.

The conduit detection system and method of the present disclosure exploits the intrinsic property of TR technique that the spatial-temporal resonance fuses and compresses the information of the multipath propagation environment, such that the real-time conduit leakage detection may be achieved.

Figure 3:
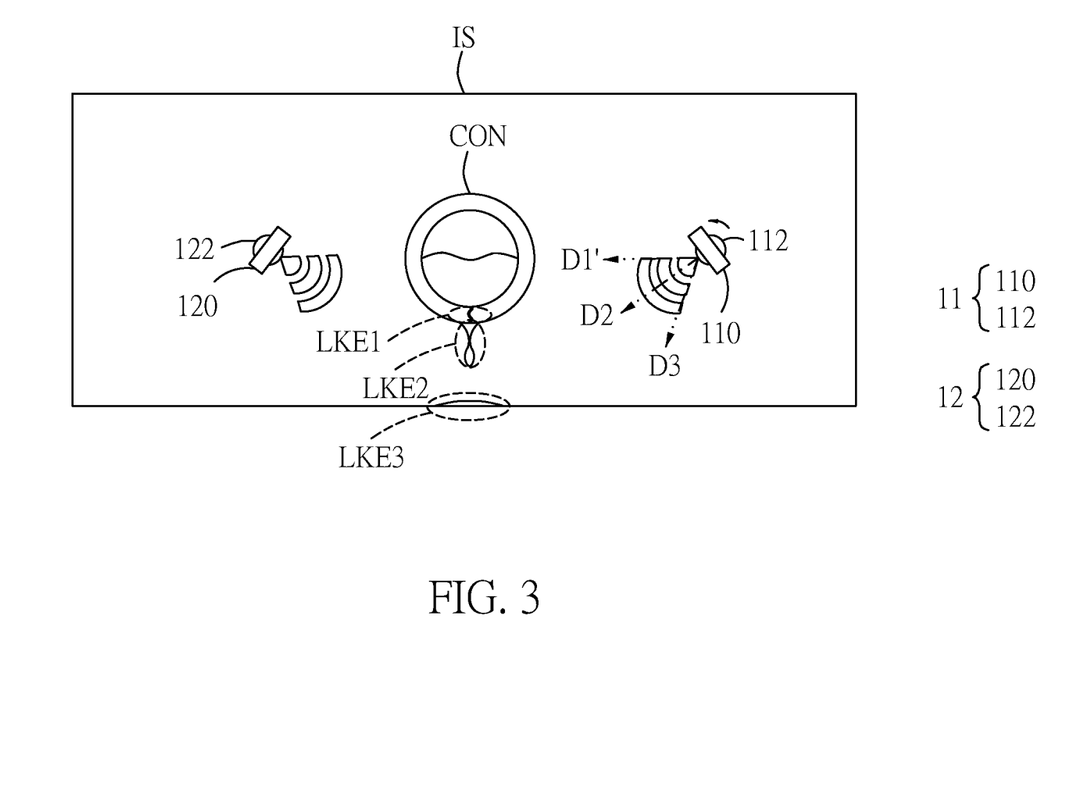
FIG. 3 shows another arrangement of the first and second transceivers according to an embodiment of the conduit detection system of the present disclosure.

Reference is now made to FIG. 3, which shows another arrangement of the first and second transceivers according to an embodiment of the conduit detection system of the present disclosure. In the present embodiment, the first transceiver 11 includes a first directional antenna 110 and a first rotation mechanism 112 coupled to the first directional antenna 110 for rotating a radiation pattern formed by the first directional antenna 110 toward a first direction D1', a second direction D2 or a third direction D3, and the second direction D2 and the third direction D3 are different from the first direction D1'. The second transceiver 12 may be fixed, or may include a second directional antenna 120 and a second rotation mechanism 122 coupled to the second directional antenna 120 for rotating the second directional antenna 120. Preferably, the directions of radiation patterns of the first directional antenna 110 and the second directional antenna 120 are not in light sight, i.e., the probe signal transmitted by the first transceiver 11 may not directly transmit to the second transceiver 12. It is because the characteristic of multipath should be utilized.

In this case, the first transceiver 11 and the second transceiver 12 belong to one set, and the angle of the directional antenna 110 may be rotated according to the shape of the conduit CON, the flow of liquid, and there are three directions to be monitored. For the first direction D1', the detection is focus on the body of the conduit CON for detecting a first conduit leakage event LKE1 where the conduit CON is cracked. For the second direction D2, the detection is focus on a region below the conduit CON for detecting a second conduit leakage event LKE2 that the fluid is leaked out of the conduit CON, and the ground has not appeared to be accumulated by the fluid yet. For the third direction D3, the region of detection is focus on the ground for detecting a third conduit leakage event that the ground is appeared to be accumulated by the fluid.

Taking a detection toward the second direction D2 for example. For detecting the second conduit leakage event LEK2, the radiation pattern formed by the first directional antenna 110 is rotated by the first rotation mechanism 112 toward the second direction D2. The first transceiver 11 is further configured to send a second probe signal toward the second direction D2, and the second transceiver 12 is configured to receive the second probe signal. Specifically, the memory 162 is further configured to store a second preset CSI, and similar to the detection flow depicted in the previously embodiment, the second preset CSI includes a second CSI and a second normal CSI. Similarly, the first transceiver 11 may be configured to send a third probe signal while rotating by the first rotation mechanism 112 toward the third direction D3 for detecting the third conduit leakage event LEK3.

The processor 160 is configured to obtain a second current CSI from the second probe signal by performing the TR process, and to compare the second current CSI to the second preset CSI. When the second CSI is matched to the second current CSI, a second conduit leakage event associated with the conduit is determined to be occurred.

Furthermore, since the first transceiver 11 may be configured to respectively send probe signals toward the first direction D1', the second direction D2, and the third direction D3, and the first transceiver 11 may further send a directional information signal indicating a direction of the probe signals, and the processor 160 is configured to determine whether a comparison between the first current CSI and the first preset CSI, between the second current CSI and the second preset CSI, or between the third current CSI and the third preset CSI to be performed according to the direction information signal.

Figure 4:
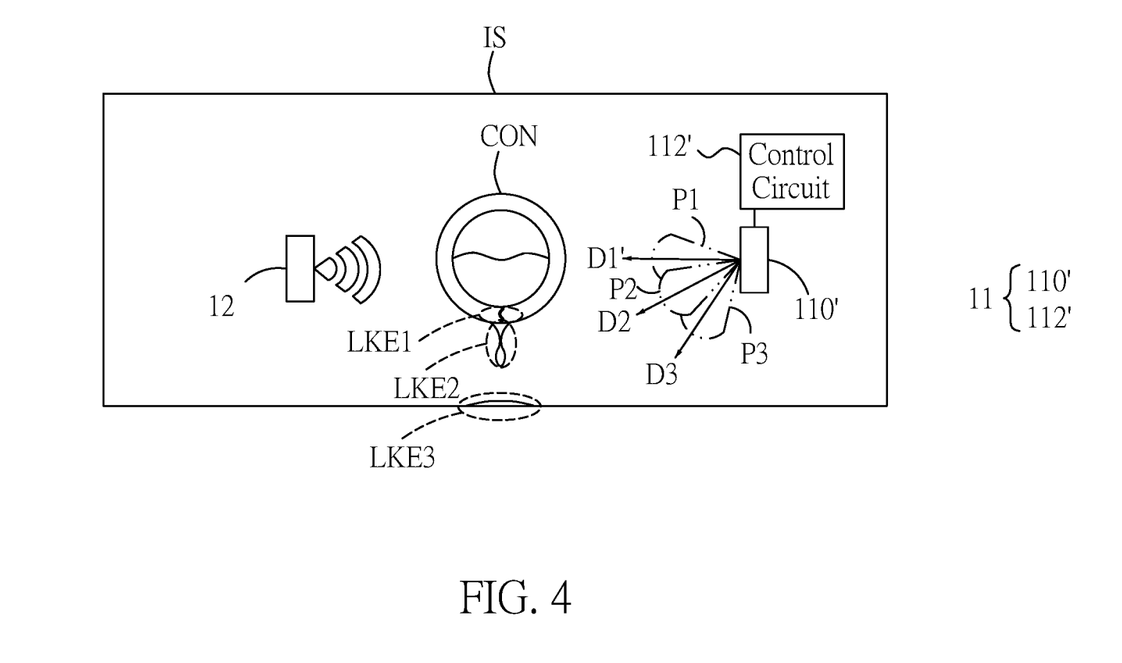
FIG. 4 shows yet another arrangement of the first and second transceivers according to an embodiment of the conduit detection system of the present disclosure.

Reference is now made to FIG. 4, which shows yet another arrangement of the first and second transceivers according to an embodiment of the conduit detection system of the present disclosure. In the present embodiment, the first transceiver 11 includes an antenna array 110' and a control circuit 112', the control circuit 112' is configured to execute a beam-forming software to control radiation pattern formed by the antenna array 110' to generate radiation pattern P1, P2, or P3 toward the first direction D1', the second direction D2 and a third direction D3, respectively, and the second direction D2 and the third direction D3 are different from the first direction D1'. The second transceiver 12 may be fixed.

Here, the detection operation of conduit leakage event is similar to the embodiment of FIG. 3. The detailed descriptions would be omitted.

Taking a detection toward the second direction D2 for example. For detecting the second conduit leakage event LEK2, the control circuit 112' is configured to control the antenna array 110' to form the radiation pattern P2 toward the second direction D2. The first transceiver 11 is further configured to send a second probe signal toward the second direction D2, and the second transceiver 12 is configured to receive the second probe signal. Specifically, the memory 162 is further configured to store a second preset CSI, and similar to the detection flow depicted in the previously embodiment, the second preset CSI includes a second CSI and a second normal CSI. Similarly, the first transceiver 11 may be configured to send a third probe signal while rotating by the first rotation mechanism 112 toward the third direction D3 for detecting the third conduit leakage event LEK3.

Similarly, the first transceiver 11 may further send a directional information signal indicating a direction of the probe signals, i.e., the direction of the radiation pattern, e.g., the radiation patterns P1, P2 and P3, and the processor 160 is configured to determine whether a comparison between the first current CSI and the first preset CSI, between the second current CSI and the second preset CSI, or between the third current CSI and the third preset CSI to be performed according to the direction information signal.

Figure 5:
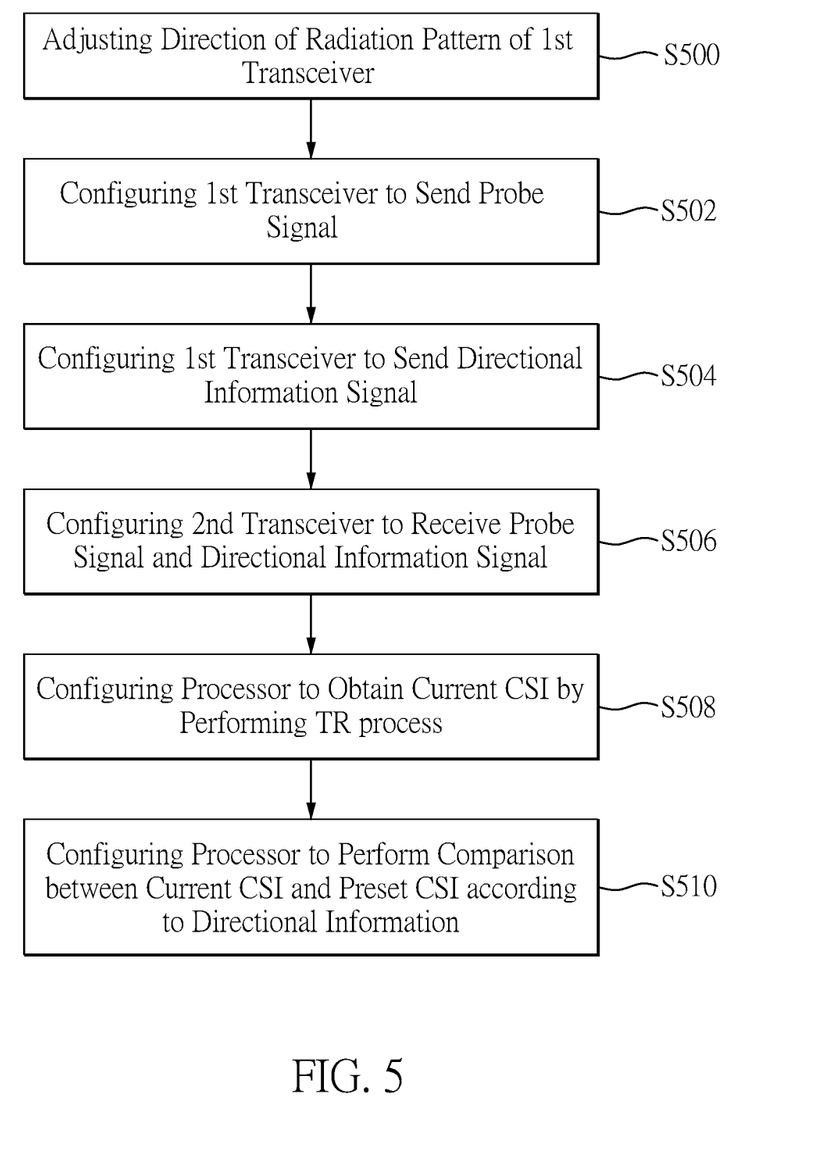
FIG. 5 shows a flow chart for detecting the leakage associated with the conduit according to another embodiment of the present disclosure.

Reference is now made to FIG. 5, which shows a flow chart for detecting the leakage associated with the conduit according to another embodiment of the present disclosure. During the online monitoring phase, that is, step S500, adjusting a direction of the radiation pattern of the first transceiver 11, by the first rotation mechanism 112, or by the control circuit 112', as depicted in FIGS. 3 and 4.

Step S502, configuring the first transceiver 11 to send a probe signal.

Step S504, configuring the first transceiver 11 to send a directional information signal.

Step S506, configuring the second transceiver 12 to receive the first probe signal and the directional information signal.

Step S508, configuring the processor 160 to obtain a current CSI from the first probe signal by performing the TR process.

Step S510, configuring the processor 160 to perform a comparison between the current CSI and the preset CSI according to the directional information. Specifically, the processor 160 is configured to determine whether a comparison between the first current CSI and the first preset CSI, between the second current CSI and the second preset CSI, or between the third current CSI and the third preset CSI to be performed according to the direction information signal.

Since various conduit leakage events may be manually defined by the user while utilizing directional configurations of the radiation pattern, the conduit detection system and method of the present disclosure may allow a more accurate estimate types of the conduit leakage in the different sections of the conduit, which results in a more accurate leakage detection mechanism that advantageously takes into account a changing environment.

Figure 6:
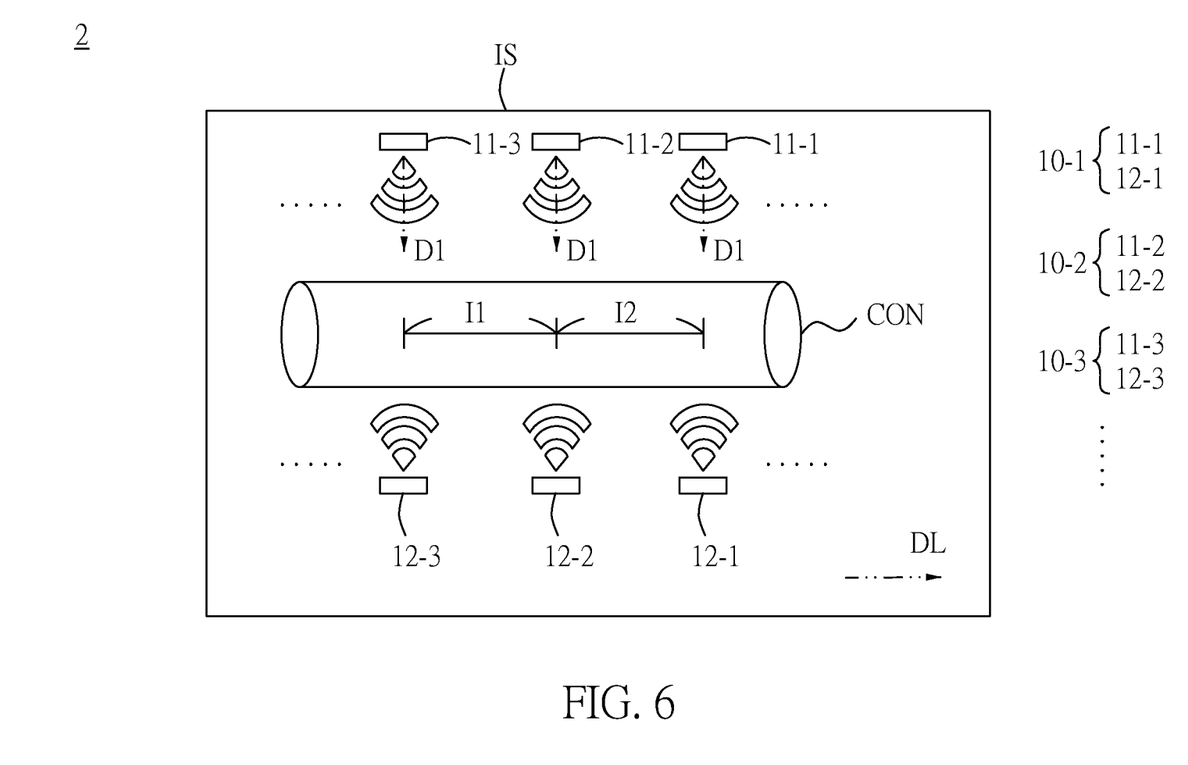
FIG. 6 shows an arrangement of the first detection unit and a plurality second detection units according to another embodiment of the conduit detection system of the present disclosure.

Reference is now further made to FIG. 6, FIG. 6 shows an arrangement of the first detection unit and a plurality second detection units according to another embodiment of the conduit detection system of the present disclosure.

As shown in FIG. 6, the conduit leakage detection system 2 includes a first detection unit 10-1 and a plurality of second detection units 10-2, 10-3 . . . , each of the second detection unit 10-2, 10-3 . . . may be configured to be the same as the first detection unit 10-1. The first detection unit 10-1 is provided as the same as the first detection unit 10 as depicted in the previous embodiments. In the present embodiment, the first detection unit 10-1 includes a first transceiver 11-1 and a second transceiver 12-1, the second detection units 10-2 and 10-3 respectively includes first and second transceivers 11-2 and 12-2, and first and second transceivers 11-3 and 12-3.

In this case, the first detection unit 10-1 and the plurality of the second detection units 10-2, 10-3, . . . , are disposed at a plurality of positions with an preset interval along a length direction DL of the conduit CON, for example, intervals I1 and I2, and the interval I1 may equal to the interval I2.

Specifically, the conduit CON may be divided into n locations along the length direction DL of the conduit CON for CSI collection. The collected procedure is to transmit a probe signal and record it at the other end as depicted in FIGS. 2 and 5, and then reverse the time to extract the CSI information of the n locations as the basis for subsequent comparison procedures.

The first detection unit 10-1 and the plurality of the second detection units 10-2, 10-3 may also connected to the server 16 through the network 14 as shown in FIG. 1. Furthermore, the memory 162 is further configured to store a first preset CSI and a plurality of third preset CSI. The first preset CSI corresponds to the first detection unit 10-1, and the third preset CSIs respectively corresponds to the plurality of the second detection units 10-2, 10-3, . . . , and each includes a third CSI and a third normal CSI.

Therefore, the processor 146 may further be configured to respectively obtain a plurality of third current CSIs from the first probe signals respectively sent from the first transceivers 11-2, 11-3, . . . of the plurality of second detection units 10-2, 10-3, . . . , by performing the TR process mentioned above, and to respectively compare the third current CSIs to the third preset CSIs.

Similarly, to implement the conduit leakage events detection in the indoor space IS based on the TR spatial-temporal resonances, the detection operation consists of the offline training phase and the online testing phase.

During the offline training phase, multiple events are provided for establishing the first preset CSI and the third preset CSIs. Taking the first preset CSI for example, the first preset CSI may include a first CSI and a first normal CSI. The first normal CSI corresponds to one event that the conduit CON is normally used, such as the fluid is normal moved through the conduit CON, and the first CSI corresponds to another event that the conduit CON is leaking.

In the exemplary embodiments of the present disclosure, the arrangement and the directional configuration respectively depicted in FIGS. 1C, 3 and 4 may be provided in the first detection unit 10-1 and the second detection units 10-2, 10-3, . . . of the present embodiment. Therefore, multiple conduit leakage events may be defined for each of the first detection unit 10-1 and the second detection units 10-2, 10-3, . . . , the conduit detection system and method of the present disclosure may allow a more accurate estimate types and positions of the conduit leakage in the different sections of the conduit.

In the detection operation, the first CSI and the first normal CSI are respectively obtained by performing a TR operation on the probe signal in response to a first conduit leakage event and a normal event associated with one region of the conduit CON, and the third CSIs and the third normal CSIs may also be respectively obtained by performing the TR operation on the probe signal in response to a third conduit leakage events and third normal events occurred in other region of the conduit CON.

Therefore, when the third CSI is matched to the corresponding third current CSI, one of a plurality of third conduit leakage events associated with the conduit is determined to be occurred.

Due to the characteristics of the 802.11ad standard, large difference may be generated between the multipath effect produced by the leaked liquid and the normal status, and thus the conduit leakage events may be accurately detected. However, it is necessary to subdivide multiple areas from the conduit CON and to repeat detections to increase the accuracy of the detection. For example, the length of the conduit CON may be m meters, and every the preset intervals I1 and I2 may be n meters, thus the conduit CON is divided into k areas and k=m/n areas.

In each of the k area, three directions as depicted in FIGS. 3 and 4 may be defined for obtaining current CSI in each area. The memory 162 may store the data of the k regions. Levels of pressure gauges may be considered for determining the value of the preset interval, for example, regions with high pressure may be provided with sufficient numbers of the detection units.

From above, the present disclosure provides a conduit leakage detection system and method that detect conduit leakage events associated with the conduit by obtaining channel state information from the time-reversal process. The conduit detection system and method of the present disclosure exploits the intrinsic property of TR technique that the spatial-temporal resonance fuses and compresses the information of the multipath propagation environment, such that the real-time conduit leakage detection may be achieved.

Furthermore, various conduit leakage events may be manually defined by the user while utilizing directional configurations of the radiation pattern, the conduit detection system and method of the present disclosure may allow a more accurate estimate types of the conduit leakage in the different sections of the conduit, which results in a more accurate leakage detection mechanism that advantageously takes into account a changing environment.

In addition, the conduit leakage events are more easily detected by adjusting the first transceiver and the second transceiver to be comply with the 802.11ad standard, the frequency bandwidth thereof is wide enough to increase the precision of detection while obtaining more CSI, and would assist the determination of existence of the conduit leakage.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which includes one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the different exemplary embodiments has been presented for purposes of illustration and description, and is not intended to be exhaustive or limited to the disclosure in the form disclosed. Many modifications and variations will be apparent to those of ordinary skill in the art. Further, different exemplary embodiments may provide different advantages as compared to other exemplary embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A conduit leakage detection system, comprising:
   a first detection unit, including:
      a first transceiver; and
      a second transceiver, communicating with the first transceiver to detect a conduit, wherein the first transceiver is configured to send a first probe signal toward a first direction while producing an estimated channel state information (CSI) between the first transceiver and the second transceiver, the first transceiver is disposed at a first side of the conduit, and the second transceiver is configured to receive the first probe signal;
   a processor; and
   a memory connected to the processor, configured to store a first preset CSI, wherein the first preset CSI includes a first CSI and a first normal CSI,
   wherein the processor is configured to time-reverse and conjugate the estimated CSI to obtain a first current CSI from the first probe signal by performing a time-reversal process, and to compare the first current CSI to the first preset CSI, and
   wherein when the first CSI is matched to the first current CSI, a first conduit leakage event associated with the conduit is determined to be occurred.

2. The conduit leakage detection system according to claim 1, wherein the processor is configured to calculate a first time-reversal resonating strength (TRRS) value between the first current CSI and the first CSI, and a second TRRS value between the first current CSI and the first normal CSI;
   wherein the first CSI is determined to be matched to the current CSI if the first TRRS value is larger than the second TRRS value and a threshold.

3. The conduit leakage detection system according to claim 1, wherein the second transceiver are substantially disposed at a second side of the conduit.

4. The conduit leakage detection system according to claim 3, wherein the first transceiver and the second transceiver are disposed along a gravity direction and the first direction is along the gravity direction.

5. The conduit leakage detection system according to claim 3, wherein the first transceiver is configured to send a second probe signal toward a second direction, and the second transceiver is configured to receive the second probe signal, and
   wherein the second direction is different from the first direction.

6. The conduit leakage detection system according to claim 5, wherein the memory is further configured to store a second preset CSI, wherein the second preset CSI includes a second CSI and a second normal CSI;
wherein the processor is configured to obtain a second current CSI from the second probe signal by performing the time-reversal process, and to compare the second current CSI to the second preset CSI, and
wherein when the second CSI is matched to the second current CSI, a second conduit leakage event associated with the conduit is determined to be occurred.

7. The conduit leakage detection system according to claim 6, wherein the first transceiver further sends a directional information signal indicating the first direction of the first probe signal or the second direction of the second probe signal transmitting to the second transceiver, and the processor is configured to determine whether a comparison between the first current CSI and the first preset CSI or between the second current CSI and the second preset CSI to be performed according to the direction information signal.

8. The conduit leakage detection system according to claim 5, wherein the first transceiver includes a directional antenna and a rotation mechanism coupled to the directional antenna for rotating a radiation pattern formed by the directional antenna toward the first direction or the second direction.

9. The conduit leakage detection system according to claim 5, wherein the first transceiver includes an antenna and a control circuit, wherein the control circuit is configured to execute a beam-forming software to control a radiation pattern formed by the antenna toward the first direction or the second direction.

10. The conduit leakage detection system according to claim 1, further comprising a second detection unit, wherein the second detection unit is configured to be the same as the first detection unit,
wherein the first detection unit and the second detection unit are disposed at different positions with an preset interval along a length direction of the conduit,
wherein the memory is further configured to store a third preset CSI, wherein the third preset CSI includes a third CSI and a third normal CSI,
wherein the processor is further configured to obtain a third current CSI from a third probe signal sent from the first transceiver of the second detection unit, by performing a time-reversal process, and to compare the third current CSI to the third preset CSI, and
wherein when the third CSI is matched to the third current CSI, a third conduit leakage event associated with the conduit is determined to be occurred.

11. The conduit leakage detection system according to claim 1, wherein the frequency range of the first probe signal is between 30 GHz and 300 GHz.

12. A conduit leakage detection method, comprising:
providing a first detection unit, wherein the first detection unit includes a first transceiver disposed at a first side of the conduit and a second transceiver;
communicating the first transceiver with the second transceiver to detect a conduit;
configuring the first transceiver to send a first probe signal toward a first direction while producing an estimated channel state information (CSI) between the first transceiver and the second transceiver;
configuring the second transceiver to receive the first probe signal;
configuring a memory connected to a processor to store a first preset CSI, wherein the first preset CSI includes a first CSI and a first normal CSI; and
configuring the processor to time-reverse and conjugate the estimated CSI to obtain a first current CSI from the first probe signal by performing a time-reversal process, and to compare the first current CSI to the first preset CSI,
wherein when the first CSI is matched to the first current CSI, a first conduit leakage event associated with the conduit is determined to be occurred.

13. The conduit leakage detection method according to claim 12, further comprising:
configuring the processor to calculate a first time-reversal resonating strength (TRRS) value between the first current CSI and the first CSI, and a second TRRS value between the first current CSI and the first normal CSI,
wherein the first CSI is determined to be matched to the current CSI if the first TRRS value is larger than the second TRRS value and a threshold.

14. The conduit leakage detection method according to claim 13, wherein the first transceiver and the second transceiver are disposed along a gravity direction and the first direction is along the gravity direction.

15. The conduit leakage detection method according to claim 13, further comprising:
configuring the first transceiver to send a second probe signal along a second direction toward a second side of the conduit, and the second transceiver is configured to receive the second probe signal,
wherein the second direction is different from the first direction.

16. The conduit leakage detection method according to claim 15, further comprising:
configuring the memory to store a second preset CSI, wherein the second preset CSI includes a second CSI and a second normal CSI; and
configuring the processor to obtain a second current CSI from the second probe signal by performing the time-reversal process, and to compare the second current CSI to the second preset CSI,
wherein when the second CSI is matched to the second current CSI, a second conduit leakage event associated with the conduit is determined to be occurred.

17. The conduit leakage detection method according to claim 16, further comprising:
sending a directional information signal indicating the first direction of the first probe signal or the second direction of the second probe signal by the first transceiver;
configuring the processor to determine whether a comparison between the first current CSI and the first preset CSI or between the second current CSI and the second preset CSI to be performed according to the direction information signal.

18. The conduit leakage detection method according to claim 15, wherein the first transceiver includes a directional antenna and a rotation module coupled to the directional antenna for rotating a radiation pattern formed by the directional antenna toward the first direction or the second direction.

19. The conduit leakage detection method according to claim 15, wherein the first transceiver includes an antenna and a control circuit, wherein the control circuit is configured to execute a beam-forming software to control a radiation pattern formed by the antenna toward the first direction or the second direction.

20. The conduit leakage detection method according to claim 12, wherein the frequency range of the first probe signal is between 30 GHz and 300 GHz.

* * * * *